US009200346B2

(12) United States Patent
Solvi et al.

(10) Patent No.: US 9,200,346 B2
(45) Date of Patent: Dec. 1, 2015

(54) DRY GRANULATION OF METALLURGICAL SLAG

(75) Inventors: Marc Solvi, Ehlange (LU); Bob Greiveldinger, Frisange (LU); Claudine Friederici, Mamer (LU); Daniel Michels, Luxembourg (LU); Mathias Hoffmann, Hesperange (LU); Horst Kappes, Trier (DE)

(73) Assignee: PAUL WURTH S.A., Luxembourg (LU)

( * ) Notice: Subject to any disclaimer, the term of this patent is extended or adjusted under 35 U.S.C. 154(b) by 370 days.

(21) Appl. No.: 13/822,725

(22) PCT Filed: Sep. 6, 2011

(86) PCT No.: PCT/EP2011/065351
§ 371 (c)(1),
(2), (4) Date: Apr. 16, 2013

(87) PCT Pub. No.: WO2012/034897
PCT Pub. Date: Mar. 22, 2012

(65) Prior Publication Data
US 2013/0206875 A1    Aug. 15, 2013

(30) Foreign Application Priority Data

Sep. 13, 2010   (LU) .......................................... 91730

(51) Int. Cl.
*B02C 19/00* (2006.01)
*C22B 1/24* (2006.01)
(Continued)

(52) U.S. Cl.
CPC ............... *C22B 1/24* (2013.01); *B02C 19/0056* (2013.01); *C04B 5/06* (2013.01); *C04B 18/141* (2013.01); *C21B 3/08* (2013.01); *C22B 7/005* (2013.01); *C22B 7/04* (2013.01); *F27B 21/06* (2013.01); *F27D 15/0266* (2013.01);
(Continued)

(58) Field of Classification Search
CPC ............ B02C 19/00; C22B 1/24; C22B 7/04; C22B 7/005; C21B 3/08; F27B 21/06; C04B 5/06; C04B 18/141; F27D 17/004; F27D 15/0266
USPC ............................................. 241/3, 101.4, 23
See application file for complete search history.

(56) References Cited

U.S. PATENT DOCUMENTS

| 4,297,119 A | 10/1981 | Ando et al. |
| 4,359,434 A | 11/1982 | Tiberg |
| 2004/0130077 A1 | 7/2004 | Detronde |

FOREIGN PATENT DOCUMENTS

| JP | 5861203 A | 4/1983 |
| JP | 2005306656 A | 11/2005 |
| JP | 2009051719 A | 3/2009 |

OTHER PUBLICATIONS

International Preliminary Report on Patentability for corresponding application PCT/EP2011/065351 filed Sep. 6, 2011; Mail date Jan. 15, 2013.

(Continued)

*Primary Examiner* — Mark Rosenbaum
(74) *Attorney, Agent, or Firm* — Cantor Colburn LLP

(57) ABSTRACT

A process for dry granulation of hot liquid slag wherein the hot liquid slag is mixed with solid metallic particles so as to form a solidified, vitrified slag cake mixed with the metallic particles, the slag cake is crushed so as to form hot slag particles and heated solid particles, said particles are cooled and said solid metallic particles are recycled.

20 Claims, 3 Drawing Sheets

(51) Int. Cl.
*C04B 5/06* (2006.01)
*C04B 18/14* (2006.01)
*C21B 3/08* (2006.01)
*C22B 7/00* (2006.01)
*C22B 7/04* (2006.01)
*F27B 21/06* (2006.01)
*F27D 15/02* (2006.01)
*F27D 17/00* (2006.01)

(52) U.S. Cl.
CPC .............. *F27D 17/004* (2013.01); *Y02W 30/54* (2015.05); *Y02W 30/94* (2015.05)

(56) References Cited

OTHER PUBLICATIONS

International Search Report for corresponding application PCT/EP2011/065351 filed Sep. 6, 2011; Mail date Apr. 24, 2012.
Chinese examination report, dated Feb. 20, 2014, relating to the corresponding Chinese patent application No. 201180044073.5.

DRY GRANULATION OF METALLURGICAL SLAG

TECHNICAL FIELD

The present invention generally relates to dry granulation of slag from the metal industry and more particularly from the iron industry.

BACKGROUND ART

Conventionally, metallurgical slag is either granulated in water or cooled in slag pits. Water quenching ensures fast solidification of the metallurgical slag, which, in the case of blast furnace slag, is a necessary condition for obtaining a valuable product. The water is firstly used to fragmentize the slag stream into small particles and then to withdraw the energy through direct contact. As this has to happen at ambient pressure, the temperature of the slag is immediately lowered to a temperature level of below 100° C., which makes it impossible to recover energy in an efficient way. Cooling of metallurgical slag in slag pits needs longer cooling times and may give different product qualities. The thermal energy in the hot slag is consequently lost to the environment.

JP 2005306656 (A) describes a method for solidifying molten slag, by which a sound slag ingot, free from bubbles or solidification/shrinkage holes can be obtained by a simple method, and it is possible to effectively use the slag as an artificial block-shaped stone material. When slag is solidified by injecting molten reformed slag into a casting mold, the slag is rapidly solidified in the casting mold by charging oxide particles continuously or intermittently to the flow of the injected slag. Reformed slag or crushed solidified slag obtained by crushing a portion of the solidified slag produced by this method is preferably used as the oxide particles.

U.S. Pat. No. 4,359,434 discloses a process for granulating blast furnace slag melts, the melt being shaped into at least one thin, liquid melt stream moving freely in a predetermined direction and which, by meeting at a predetermined incidence angle with a stream of fine grained, solid particles flowing substantially freely in a substantially uniform direction at a high rate of flow in relation to the melt stream, being converted at least partly into a substantially fine-grained granulate having a fan-shaped distribution over at least part of the opposite angle to the incidence angle.

For a continuously operated blast furnace in the iron and steel industry at a theoretical average slag flow rate of 2 t/min, the thermal power contained in the slag is equal to 56 MW (thermal power=energy content (1200 J/kg/K)*temperature difference (1400 K)*flow rate (2 t/min=33.3 kg/s)=56 MW). This results in an electrical power of 22 MW if converted with an efficiency of 40%.

To use this potential in an efficient way, it is necessary to rapidly cool down the slag to a temperature level, which is low enough to make the treatment of the material easier but high enough to preserve the energy at a useable level. Care must also be taken to lower the temperature quick enough and far enough to obtain a vitrified slag rather than an amorphous slag, which is a lot less priced (about 15 times) in the market.

This can be achieved by mixing liquid slag with cold slag granulates of the same chemistry. The slag can then be subject to heat recovery in a heat exchanger.

It has been found however that due to the high viscosity of the liquid slag, the cold slag granulates and the liquid slag do not mix easily and thus it is not possible to cool the liquid slag fast enough to obtain vitrified slag.

BRIEF SUMMARY

The present invention generally provides a dry slag granulation process.

More particularly, the present invention proposes a process for dry granulation of hot liquid slag wherein the hot liquid slag is mixed with metallic particles so as to form a solidified, vitrified slag cake mixed with said metallic particles, said slag cake is crushed into hot slag particles and heated solid particles, said particles are cooled and said solid metallic particles are recycled.

According to a preferred embodiment, the hot liquid slag is poured first into a trough and then the solid metallic particles are poured into the trough containing the hot liquid slag. The hot liquid slag and solid metallic particles are mixed so as to form a solidified, vitrified slag cake. The trough is first filled up to preferably about one third of its height with liquid slag and then the solid metallic particles are introduced into the trough.

The solid metallic particles are preferably dropped from a height of about 1 to 3 m to obtain a quick and efficient mixing of the slag and the solid metallic particles. The exact height i.e. the exact amount of energy required for the particles to penetrate the liquid slag to the desired depth depends on the composition of the slag, the temperature of the slag, the density and the diameter of the solid metallic particles etc.

The trough in which the hot liquid slag and the solid metallic particles are poured is preferably integrated in a troughed belt conveyor.

The solid metallic particles advantageously have a density of at least 2,5 g/cm$^3$. Due to the difference of densities between the slag and the metallic particles, the metallic particles and the slag mix thoroughly.

The solid metallic particles are preferably spherical so as to have good mixing properties and to assure a rapid and efficient cooling of the slag.

The solid metallic particles preferably have a diameter of at least 2 mm preferably more than 5 mm and most preferably more than 10 mm.

The solid metallic particles advantageously have a diameter of less than 80 mm, preferably less than 50 mm and most preferably less than 25 mm.

The solid metallic particles are preferably made of a metal chosen amongst the group consisting of iron, steel, aluminum, copper, chrome, their alloys, as well as their alloys with other metals.

In practice, it is preferred to use steel balls because they are readily available in different diameters.

After solidification, the hot slag particles and heated solid metallic particles are charged in a heat exchanger, cooled with a countercurrent flow of cooling gas and discharged from the heat exchanger.

According to a preferred embodiment, the heat exchanger is subdivided in a plurality of subunits, each of said subunits having a particle inlet port, a particle outlet port, a cooling gas inlet port and a cooling gas outlet port, wherein at least one of the subunits is charged with hot slag particles and heated solid metallic particles through the particle inlet port, cooled slag particles and cooled solid metallic particles are discharged through said particle outlet port from said at least one of the subunits, said cooling gas inlet port and said cooling gas outlet port being closed during the charging and discharging of particles and wherein, simultaneously to the charging and discharging of particles, at least one of the other subunits is cooled by injecting a flow of cooling gas through the cooling gas inlet port and withdrawing a flow of heated cooling gas from said cooling gas outlet port, said particle inlet port and said particle outlet port being closed during the cooling of particles and wherein the heated cooling gas is used for energy recovery.

Accordingly, the process according to a preferred embodiment of the invention proposes to use heat exchangers comprising multiple subunits, which are operated discontinuously. As it is advantageous to obtain a constant hot gas flow at the exit of the heat exchanger in order to guarantee the most efficient use of electric power generation cycles, the multiple heat exchanger subunits are operated alternately in a way that an essentially constant hot gas flow is guaranteed. By this, it is possible to obtain an essentially continuous gas handling which is decoupled from the batch type material handling.

At each moment in time, where one of the heat exchanger subunits is in emptying/filling stage, no cooling gas is flowing through this heat exchanger subunit during emptying/filling.

The same quantity of particles is filled into and extracted from the exchanger. Meanwhile, no material is entering or leaving the other heat exchanger subunits; they can thus be completely sealed off from the environment during cooling.

Preferably, one of the subunits is charged with hot slag particles and heated solid metallic particles through the particle inlet port while cooled slag particles and cooled solid metallic particles are discharged simultaneously through the particle outlet port of the same subunit.

Once the heat exchanger subunit is filled up, the particle inlet and the particle outlet ports are sealed and the subunit is reconnected to the cooling gas stream while another heat exchanger subunit may be disconnected. The cooling gas flow through these heat exchanger subunits does thus not encounter any leakage, thereby preventing dust and energy leaving the system. The heat exchanger subunits thus only need to be depressurized during charging and discharging of the slag.

According to a preferred embodiment, the hot slag particles and heated solid metallic particles are first charged into an insulated pre-chamber before they are charged into one of the heat exchanger subunits. The pre-chamber is preferably insulated either by refractory lining or material stone box. The low thermal conductivity of slag gives excellent insulation properties.

The slag particles and solid metallic particles may also be charged in a post-chamber after cooling and after being discharged from the heat exchanger subunit. In other words, the cycle time and the quantity of particles charged may thus be chosen in such a way that the heat transfer inside the heat exchanger subunits may be controlled and kept quasi-stationary. The outlet gas temperature fluctuation caused by charging/discharging of the heat exchanger subunits will thus be minimized by choosing cycle times accordingly.

According to a further preferred embodiment, hot liquid slag is solidified in a slag cake and cooled down to about 650° C. to 750° C. by mixing it with solid metallic particles. Advantageously, the hot liquid slag is mixed with about the same volume, preferably resulting in a mixture containing from about 40% to about 60% volume of solid metallic particles. The required volume of metallic particles depends on the desired target temperature, the density and the heat capacity of the metallic particles, . . . . For steel spheres, 40% to 60% (volume percentage of total volume) are preferable Preferably, the heat exchanger subunits are operated under a pressure from 1.2 bar to 4 bar i.e. the absolute pressure measured at the bottom of the slag layer in the subunit The slag cake is preferably crushed into particles of a granulometry of about 40-120 mm and a bulk density of about 2-5 g/cm$^3$, preferably of a granulometry of about 40-90 mm and a bulk density of about 2-5 g/cm$^3$.

BRIEF DESCRIPTION OF THE DRAWINGS

A preferred embodiment of the invention will now be described, by way of example, with reference to the accompanying drawing in which.

DESCRIPTION OF PREFERRED EMBODIMENTS

Figure 1:
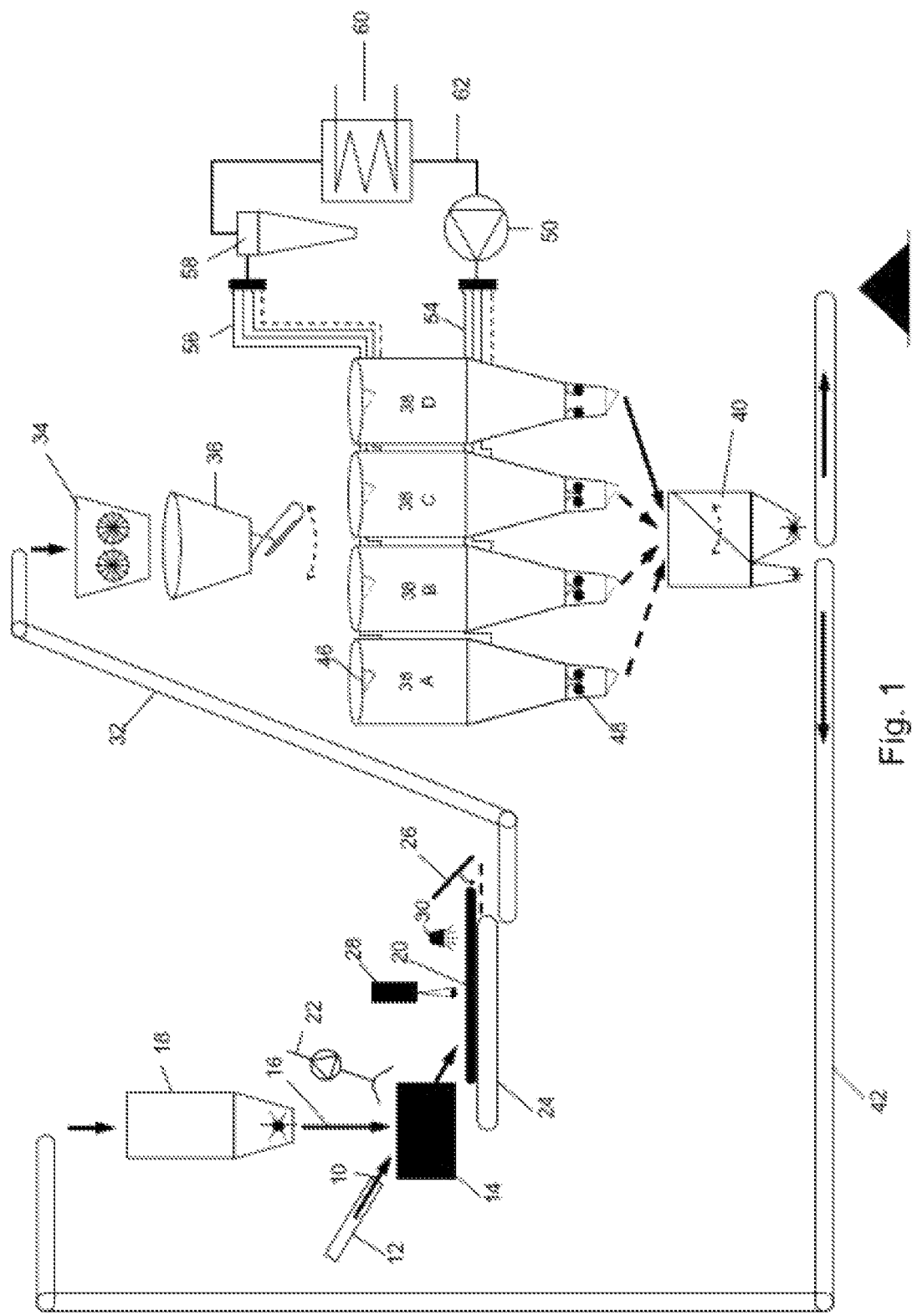
FIG. 1 is a flow sheet of a preferred embodiment of the process according to the invention.

FIG. 1 shows a schematic view of a preferred embodiment of dry granulation of hot liquid material.

Hot liquid slag 10 at a temperature of about 1500° C. having a density of about 2.7 g/cm$^3$ is transported in a slag runner 12 or in a slag ladle (not shown) and transferred at a flow rate of about 0.5 to about 4 t/min to a granulator/mixer 14. In this granulator/mixer 14, the hot liquid slag is mixed with up to three times the flow rate i.e. about 1 to about 12 t/min of solid metallic particles 16 having a granulometry of 2-50 mm, a bulk density of between 3 and 10 g/cm$^3$ at a temperature ranging from the ambient temperature to about 100° C. coming from a first storage bin 18 to form a slag cake 20 having a density of about 4 g/cm$^3$ and a temperature of less than about 800° C.

It was shown that in particular steel balls are suitable as solid, metallic particles and readily available. Surprisingly, it was found that dropping the solid metallic particles from a certain height gives them enough kinetic energy to penetrate into the liquid slag and to be distributed evenly throughout the height of the slag cake which is formed.

The amount of kinetic energy needed to achieve a uniform distribution of the solid metallic particles throughout the hot liquid slag depends on the viscosity of the slag, the nature of the particles and their density as well as on their diameter.

The advantage of using discrete particles submerged into the liquid slag is that the heat transfer is very efficient and quick so that the slag is cooled rapidly and vitrifies completely.

An aspiration device 22 situated above the first granulator/mixer 14 recuperates any dust particles emitted during the mixing of the liquid slag and the solid metallic particles.

The slag cake 20 thus formed is discharged onto a heat resistant conveyor belt 24 at a flow rate of about 4 t/min and transported to a first breaker 26, where the slag cake is crushed so as to form pieces of solidified slag, with the metallic particles mixed therein, of a granulometry of less than about 200 mm.

While the slag cake 20 is transported to the breaker 26, a thermal camera 28 measures the temperature of the slag cake 20 and, if required, water is sprayed onto the slag cake 20 by a water sprayer 30 in order to adjust the temperature of the slag cake 20 to a temperature of about 800° C.

The pieces of solidified slag with the metallic particles mixed therein are transferred from the first breaker 26 to a bucket apron conveyor 32 and transported to a second breaker 34 where the granulometry of the pieces of solidified slag with the metallic particles mixed therein is reduced to a size of about 40-80 mm. This continuous material stream of pieces of solidified slag at a temperature of about 700° C. and a granulometry of about 40-90 mm and a bulk density of about 2-5 g/cm$^3$ are collected in a pre-chamber 36. This second breaker 34 is optional. Depending on the granulation method and/or the slag properties the first breaker 26 may be used to reduce the granulometry to less than about 90 mm and thus eliminate the need for a second breaker. The pieces of solidified slag with the metallic particles mixed therein are then transferred from the pre-chamber 36 to a heat exchanger 38 comprising in the embodiment depicted on FIG. 1 four heat exchanger subunits A, B, C, D which operate in a counter current mode, i.e. the hot material is fed from the top and withdrawn from the bottom after it has been cooled, whereas the cooling gas, usually air, is injected through the bottom and withdrawn from the top after it has been heated up. During the passage of the air through the heat exchanger, the air is heated up and the slag and the solid metallic particles contained in the heat exchanger is cooled to about 100° C. and is discharged in a post-chamber 40. The slag particles are then separated from the solid metallic particles. The methods used to separate the solid metallic particles and the solidified slag may comprise crushing and sieving or milling and sieving, milling and using magnetic fields, etc. The tests made showed that the solidified slag is brittle and that the solidified slag does not stick to the steel spheres.

The cooled slag is stored for further use whereas the cooled solid metallic particles are transported via a pipe conveyor 42 to the first storage bin 18 and to the granulator 14 where it is mixed with the hot liquid slag.

In the embodiment as depicted on FIG. 1, a heat exchanger with four subunits A, B, C, D is used.

From the pre-chamber 36, the pieces of solidified slag and the solid metallic particles are distributed to four different heat exchanger subunits A,B,C,D, equipped with a material gate 46 at the top and a sealing flap 48 at the bottom.

While one of these subunits of the heat exchanger is in emptying/filling stage (cf. FIG. 1; heat exchanger subunit D), the three remaining subunits are in the cooling mode. (cf. FIG. 1: A-B-C in operation).

Once the heat exchanger subunit D is filled up, the material gate 46 at the top and the sealing flap 48 at the bottom are closed and the cooling gas stream through heat exchanger subunit D is activated. The next heat exchanger subunit in the sequence is then disconnected from the gas circuit and the cooled slag particles and the solid metallic particles are evacuated and new hot slag particles and solid metallic particles are transferred into the subunit.

The described sequential operation of the heat exchanger subunits allows to completely seal off the heat exchanger 38 from the atmosphere during the heat exchange phase, without any losses of gas or dust to the environment. Each heat exchanger subunit is depressurized and isolated from the gas flow only during the charging and discharging of slag particles in order to allow the operation without any negative impact on the heat transfer and on the environment.

The cycle time and the amount of particles charged in one cycle is selected in such a way that from the perspective of the heat transfer it can be regarded as a quasi-stationary operation with very low temperature fluctuation in the gas stream. The term cycle time is used herein to describe the time frame during which each heat exchanger subunit is connected or disconnected from the continuous gas flow. During cooling, the particles inside the exchanger will have a temperature gradient from cold at the outlet gate to hot at the inlet gate. The amount of particles charged and discharged during one cycle should thus be limited so that the temperature difference between the outlet before and after charging/discharging does not exceed, for instance 50° C.

The heat exchanger subunits A,B,C,D are specifically designed and suitable to operate under elevated pressure, which reduces pressure loss of the gas stream considerably and as such the necessary blower/compressor power to circulate the gas through the heat exchanger and steam generator. In this configuration, only the gas losses which occur during the depressurizing of one subunit have to be compensated by a booster blower/compressor (not shown) which serves at the same time as the pressure controller. It is estimated that augmenting the pressure inside the exchanger from 1 bar to 3 bar (absolute), the necessary blower/compressor power drops to approximately ⅓.

The gas stream created by the fan 50 is led to the three heat exchanger subunits in the cooling mode through a gas duct 54. After the heat exchange took place, the heated gas streams are led out through a hot gas duct 56. The dust is filtered out in a cyclone 58 before the hot gas at about 700° C. is transferred to a heat exchanger for steam creation 60. The steam thus generated is transferred to a turbine (not shown) and a generator (not shown) to produce electricity. The cooled gas is then led back via a pipe 62 in a closed loop system to the fan 52.

At the temperature level of about 700° C., thermodynamic cycle processes for power generation operate at best efficiency. Furthermore, this temperature level offers best flexibility and efficiency for direct heat recovery.

Since the particle-gas heat exchanger 38 runs continuously, efficient electricity generation is possible. In the present embodiment, both the material and gas streams enter and leave the heat exchanger continuously. The material and gas handling are however decoupled: gas leakage is no longer an issue as the concerned heat exchanger subunit is decoupled from the gas flow during charging and discharging. Accordingly, sealing of the heat exchanger subunits can easily be obtained with sealing flaps as no material is in movement inside the exchanger during the gas flow.

The advantages arising from this concept are numerous

Due to the decoupling of the gas and material flows, the sealing of the heat exchanger is simplified and dust emissions into the environment are eliminated respectively minimized. The sealing of the heat exchanger subunits during the cooling operation eliminates the risk of gas leakage and thus the effect of "sand blasting" caused by slag particles entrained by the escaping gas is no longer an issue. This results in lower wear and increased overall operating stability and availability.

The separation of cooling and charging/discharging the heat exchanger subunits allows to operate the cooling phase under a pressurized gas circuit, which reduces the pressure drop over the material layer and energy consumption of the fan.

As the total mass of particles is distributed to several heat exchanger subunits instead of one, the individual subunits have a smaller cross-section. The reduced diameter of the heat exchanger subunits allows easier distribution of the counter current gas flow over the whole cross section. Furthermore, as seen above, the quantity of leaking gas can be significantly lowered. This combined effect leads to better overall efficiency since the required fan power is lower. The overall thermal efficiency of the slag granulation process is increased due to reduced losses of hot air.

No constantly rotating parts are needed in this concept, indeed no rotary valves are needed to discharge the heat exchangers, only a pinch/slider/squeeze valve is needed. This results in lower wear.

This concept allows continuous operation even if one of the heat exchanger subunits is out of order, although at a decreased overall slag flow rate. This allows easy maintenance on one of these exchanger subunits. Furthermore, unforeseen failures on one of the exchanger subunits do not create the need of shutting down the whole process.

Figure 2:
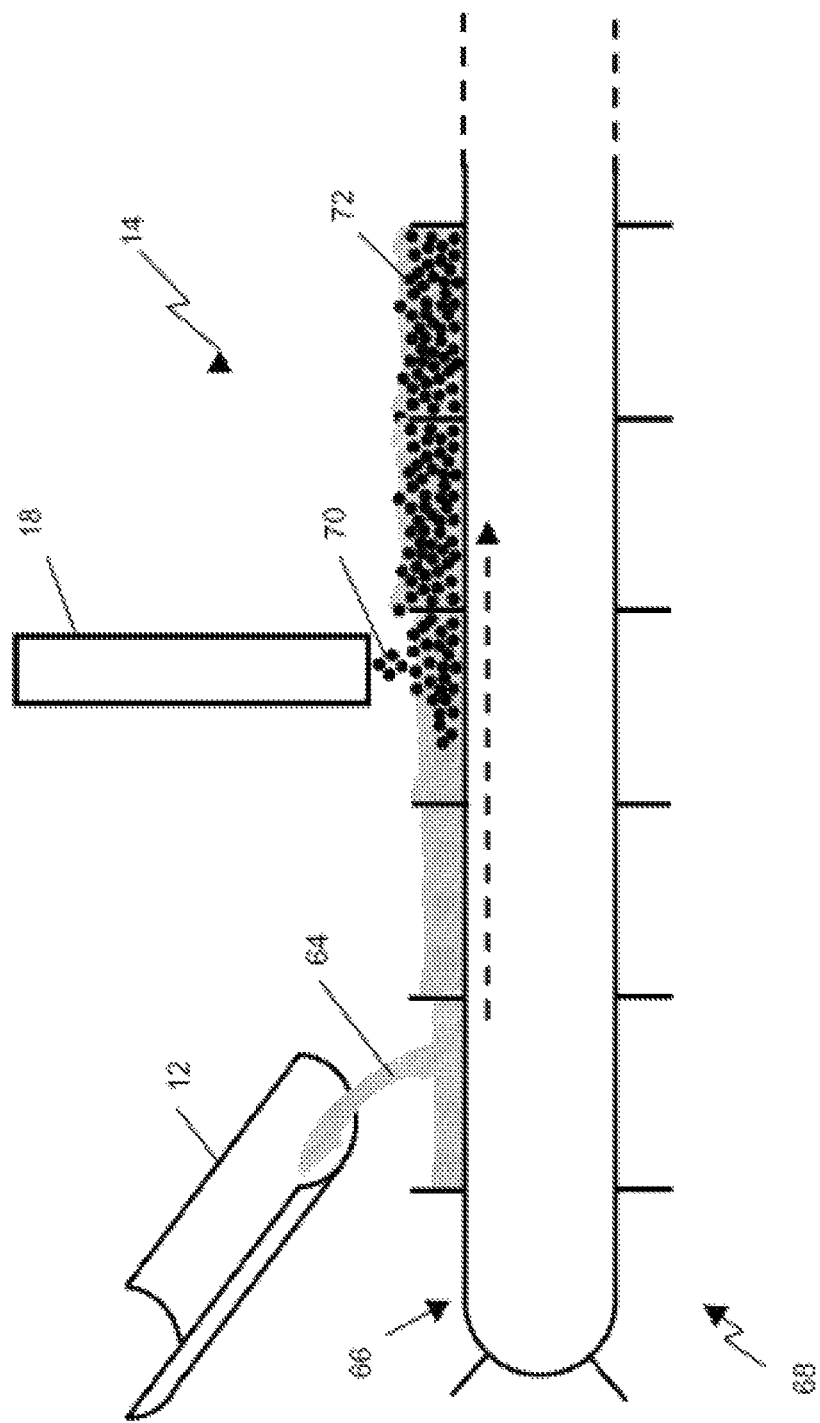
FIG. 2 shows a schematic view of a first, preferred granulator/mixer for the dry granulation of hot liquid material.

FIG. 2 shows a first, preferred embodiment of the granulator/mixer 14 as shown schematically in FIG. 1. Hot liquid slag 64 from a slag runner 12 is poured first into a trough 66 of a troughed belt conveyor 68 and then the solid metallic particles 70 are poured into the trough 66 containing the hot liquid slag 64. The hot liquid slag 64 and solid metallic particles 70 are mixed so as to form a solidified, vitrified slag cake 72. Each trough 66 of the troughed belt conveyor 72 is first filled with liquid slag and then advances under the first storage bin 18 to be filled with solid metallic particles, which are dropped into each trough 66. After solidification, the troughs 66 are emptied on a bucket apron conveyor 32 as shown in FIG. 1.

Each trough 66 is first filled up about one third of its height with liquid slag 64 and then the solid metallic particles 70 are introduced into the trough 66.

The solid metallic particles 70 having a diameter of 10 mm are dropped from a height of about 2 m to obtain a quick and efficient mixing of the slag 64 and the solid metallic particles 70.

Figure 3:
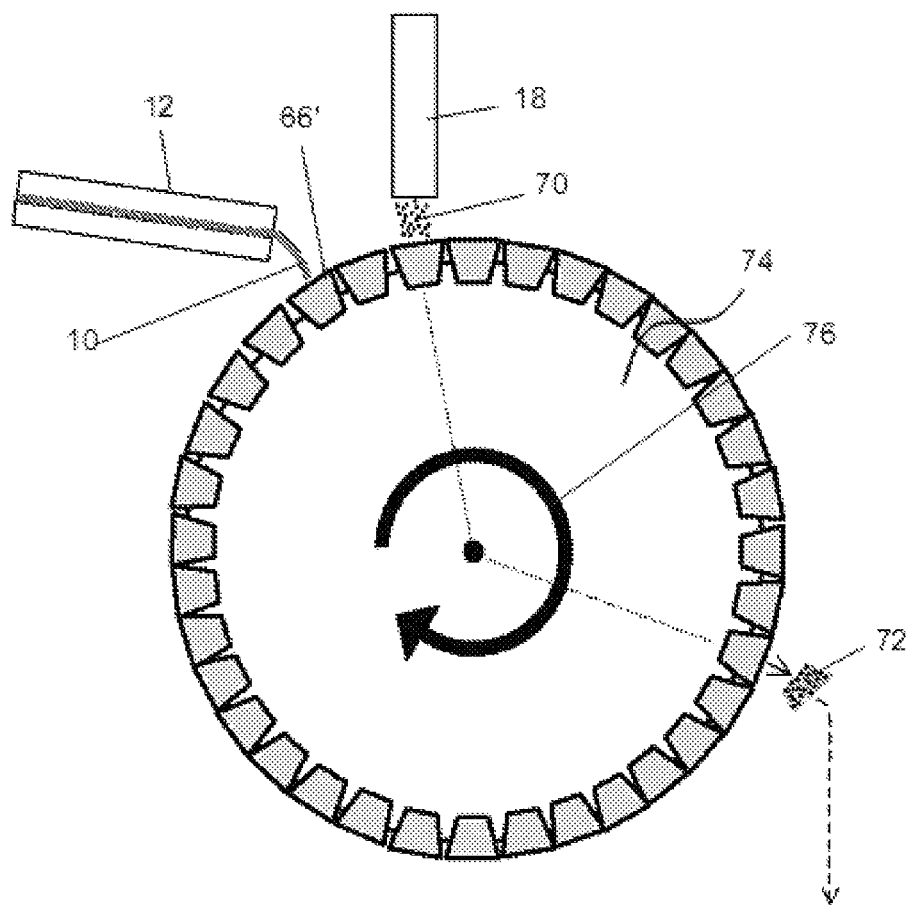
FIG. 3 shows a schematic view of a second, preferred granulator/mixer for the dry granulation of hot liquid material.

FIG. 3 shows a second, preferred embodiment of the granulator/mixer 14 as shown schematically in FIG. 1. Hot liquid slag 10 from a slag runner 12 is poured first into a trough 66'. While the troughs in FIG. 1 are fixed on a conveyor belt 24, the troughs in the embodiment of FIG. 2 are fixed on a rotating drum 74. In a first position, the trough 66' is brought under the slag runner 12 and filled up to about one third of the its height with liquid slag 10 and is then rotated in the direction of the arrow 76 towards a second position underneath the first storage bin 18 for solid metallic particles. Solid metallic particles 70 are poured into the trough 66' containing the hot liquid slag. The hot liquid slag and solid metallic particles 70 are mixed through the action of the kinetic energy of the falling solid metallic particles 70 so as to form a solidified, vitrified slag cake 72. The troughs 66' are then rotated to a third position where they are emptied by the action of gravity onto a bucket apron conveyor 32 as shown in FIG. 1.

Each trough 66' of the rotating drum 74 is first filled with liquid slag and then advances under the first storage bin 18 to be filled with solid metallic particles, which are dropped into each trough 66' and advances then to a third position where the solidified, vitrified slag cake 72 falls out of the through 66'. The trough 66' is then rotated further until it reaches the first position again.

One of the advantages of the embodiment of FIG. 3 is that there is no relative movement between adjacent troughs. The available cooling time in the troughs depends on the diameter of the drum, which short because of the addition of solid metallic particles which assures a fast solidification inside the trough.

The invention claimed is:

1. A process for dry granulation of hot liquid slag wherein the hot liquid slag is mixed with solid metallic particles so as to form a solidified, vitrified slag cake mixed with said metallic particles, said slag cake is crushed so as to form hot slag particles and heated solid particles, said particles are cooled and said solid metallic particles are recycled.

2. The process for dry granulation of hot liquid slag according to claim 1, wherein the hot liquid slag is poured first into a trough and then the solid metallic particles are poured into the trough containing the hot liquid slag and mixed with solid metallic particles so as to form a solidified, vitrified slag cake.

3. The process for dry granulation of hot liquid slag according to claim 2, wherein the trough in which the hot liquid slag and the solid metallic particles are poured is integrated in a troughed belt conveyor or on a rotating drum.

4. The process for dry granulation of hot liquid slag according to claim 1, wherein said solid metallic particles have a density of at least 2.5-g/cm$^3$.

5. The process for dry granulation of hot liquid slag according to claim 1, wherein said solid metallic particles are spherical.

6. The process for dry granulation of hot liquid slag according to claim 1, wherein said solid metallic particles have a diameter of at least 2 mm.

7. The process for dry granulation of hot liquid slag according to claim 1, wherein said solid metallic particles have a diameter of less than 80 mm.

8. The process for dry granulation of hot liquid slag according to claim 1, wherein said solid metallic particles are made of a metal chosen from the group consisting of iron, steel, copper, chrome aluminum, their alloys, and their alloys with other metals.

9. The process for dry granulation of hot liquid slag according to claim 1, wherein hot slag particles and heated solid metallic particles are charged into a heat exchanger, cooled with a countercurrent flow of cooling gas and discharged from the heat exchanger wherein the heat exchanger is subdivided in a plurality of subunits, each of said subunits having a particle inlet port, a particle outlet port, a cooling gas inlet port and a cooling gas outlet port, wherein at least one of the subunits is charged with hot particles through the particle inlet port, cooled particles are discharged through said particle outlet port from said at least one of the subunits, said cooling gas inlet port and said cooling gas outlet port being closed during the charging and discharging of particles and wherein, simultaneously to the charging and discharging of particles, at least one of the other subunits is cooled by injecting a flow of cooling gas through the cooling gas inlet port and withdrawing a flow of heated cooling gas from said cooling gas outlet port, said particle inlet port and said particle outlet port being closed during the cooling of particles and wherein the heated up cooling gas is used for energy recovery.

10. The process for dry granulation according to claim 9, wherein the slag particles and the solid metallic particles are charged in a pre-chamber before being charged into a heat exchanger subunit.

11. The process for dry granulation according to claim 9, wherein the slag particles and the solid metallic particles are charged in a post-chamber after being discharged from a heat exchanger subunit.

12. The process for dry granulation according to claim 9, wherein at least one of the subunits is charged with hot slag particles and heated solid metallic particles through the inlet port while cooled slag and metallic particles are discharged simultaneously.

13. The process for dry granulation according to claim 9, wherein the heat exchanger subunits are operated under a pressure from 1.2 bar to 4 bar.

14. The process for dry granulation according to claim 1, wherein the hot slag particles have a temperature of at least 450° C.

15. The process for dry granulation according to claim 1, wherein the hot liquid slag is solidified in a slag cake and cooled down to about 650° C.-750° C. by mixing it with solid metallic particles.

16. The process for dry granulation according to claim 1, wherein the hot slag particles have a temperature of at least 500° C.

17. The process for dry granulation according to claim 1, wherein the hot slag particles have a temperature of at least 600° C.

18. The process for dry granulation according to claim 1, wherein the hot slag particles have a temperature of at least 650° C.

19. A process for dry granulation of hot liquid slag, comprising:
   collecting hot liquid slag in a plurality of receptacles;
   mixing solid metallic particles throughout said hot liquid slag in said receptacles;
   cooling said hot liquid slag in the receptacles using said solid metallic particles to form a plurality of solidified, vitrified slag cakes having said metallic particles distributed throughout said slag cakes;
   crushing said slag cakes to form hot slag particles and heated solid particles;
   transferring said hot slag particles and said heated solid particles to a plurality of heat exchangers; and
   sequentially extracting heat from said hot slag particles and said solid metallic particles in said heat exchangers.

20. The process for dry granulation according to claim 19, wherein said process is a continuous process, further comprising:
   utilizing the heat to continuously create steam and transfer the steam to a turbine and generator to produce electricity.

* * * * *